United States Patent [19]
Naito et al.

[11] Patent Number: 5,354,594
[45] Date of Patent: Oct. 11, 1994

[54] WEATHER STRIP

[75] Inventors: Takeshi Naito; Masanori Aritake, both of Aichi, Japan

[73] Assignee: Toyoda Gosei Co., Ltd., Nishikasugai, Japan

[21] Appl. No.: 784,504

[22] Filed: Oct. 31, 1991

[30] Foreign Application Priority Data

Oct. 31, 1990 [JP] Japan .................. 2-296685

[51] Int. Cl.$^5$ .................................................. E06B 7/16
[52] U.S. Cl. ................................. 428/122; 49/490.1; 428/90; 428/358
[58] Field of Search ............... 428/90, 122, 358, 31; 49/490.1

[56] References Cited

U.S. PATENT DOCUMENTS

| | | | |
|---|---|---|---|
| Re. 32,757 | 9/1988 | Yamazaki et al. | 428/423.1 |
| 3,819,444 | 6/1974 | Ungerer | 428/43 X |
| 3,943,018 | 3/1976 | Petry et al. | 428/90 X |
| 4,587,149 | 5/1986 | Murachi | 428/90 |
| 4,943,466 | 7/1990 | Bareich | 428/122 |

FOREIGN PATENT DOCUMENTS

| | | |
|---|---|---|
| 56-19813 | 5/1981 | Japan . |
| 57-46742 | 10/1982 | Japan . |
| 59-33111 | 8/1984 | Japan . |

*Primary Examiner*—Henry F. Epstein
*Attorney, Agent, or Firm*—Cushman, Darby & Cushman

[57] ABSTRACT

The invention is a weather strip having good water-repellency and a method for preparing a weather strip for an automobile or a building. The weather strip includes a flock portion on its sealing portion surface to which a hardened reactive silicone layer is coated. The reactive silicone layer is made of a base material, a catalyst and a solvent. The hardened reactive silicone layer may further include a coupling agent, an ultraviolet cut-off pigment or a fine powder. The weather strip is prepared by applying the reactive silicone layer to the flock portion of the weather strip and curing the reactive silicone at a temperature of 80°–150° C. for 1–20 minutes.

10 Claims, 3 Drawing Sheets

WEATHER STRIP

BACKGROUND OF THE INVENTION

1. Field of the Invention

This invention relates to a weather strip which may be used for an automobile, a vehicle, a building, or a display case, and particularly this invention relates to a weather strip having a flock portion on its surface.

2. Description of the Related Art

Weather stripping used to seal around glass windows of an automobile, for example, can include an attachment portion to be attached to a door panel and a seal portion for sealing a gap between a sliding door window and a door panel. Many of these types of weather strips have flock portions on their surfaces of the sealing portions to reduce the sliding friction of a door window.

The pile of the flock portion, however, is generally made of Nylon and has low water-repellency. When rainwater, washing water, or aspirated water (water, hereafter) contact the flock portion, they tend to stay at the flock portion. In this case, the water is frozen at a low temperature and then the door window does not move smoothly or may be locked because of the ice.

To prevent this problem, a silicone oil (Dimethylpolysiloxane) having water-repellency is coated on the flock portion. But the oil is transferred to the door window when sliding on the flock portion, and it hinders sight through the door window and stains clothes of passengers or drivers.

SUMMARY OF THE INVENTION

An object of the present invention is to solve the above-mentioned problem by providing a flocked weather strip having good water-repellency at its flocked portion to prevent freeze-lock of a door window.

In order to achieve the foregoing object, the main feature of this invention is a weather strip having a hardened reactive silicone layer on its flock portion.

The hardened reactive silicone layer may include fine powder, and preferably the fine powder should have good adhesion ability to the reactive silicone.

Preferred embodiments of each material used for the present invention are described below:

I. Weather Strip Body

As a material for a weather strip body, rubber material such as EPDM (Ethylene-Propylene-Nonconjugated-diene terpolymer), EPM (Ethylene-Propylene Copolymer), or SBR (Styrene-Butadiene Rubber), and synthetic resin such as Polyvinylchloride, EVA (Ethylene Vinylacetate Copolymer), or thermoplastic elastomer, may be used. The shape of the sealing portion of the weather strip which touches the door window may be in any form such as a tube or a lip made of a sponge or solid material.

II. Flock Portion

As a flocking pile, 6-Nylon, 6.6 Nylon or Polyester may be used, and a diameter of the pile is generally 1 to 10 denier, and 2 to 5 denier may be preferable. 6-Nylon or 6.6 Nylon are preferable because of their adhesion ability to silicone. The length of flocks is generally 0.4 to 1.5 mm, and 0.6 to 1.2 mm is preferable.

III. Reactive Silicone

A. As the main component of reactive silicone, the following material may be used, and the components, which are cited in Japanese Patent Publication (examined) Number Sho-56-19813, may be used too.

1) Base material

A mixture of diorganopolysiloxane, which has a terminal hydroxyl group, and organohydrodienesiloxane may be used. The organic groups may include an alkyl group, alkenyl group, aryl group, or aralkyl group. An average molecular weight of the base material ranges from 2000 to 20000 and a viscosity from 2000 to 20000 cps.

2) Catalyst

Organotin compounds, platinum, platinum compounds, or dibutyltin laurate may be used.

3) Solvent:

Organic solvents such as N-hexane, N-heptane, Toluene, Isopropanol, Butanol, Methanol, Ethanol, 1.1.1-Trichloroethane, or Trichloroethylene may be used.

B. The following additives may be used.

1) Coupling agent

A coupling agent raises the adhesion of reactive silicone to the flock portion. A Titanate type or Silane type coupling agent such as $\gamma$-glycidoxypropyltrimethoxysilane, $\gamma$-glycidoxypropylmethyldimethoxysilane, $\gamma$-aminopropyltrimethoxysilane, $\gamma$-aminopropyltriethoxysilane, $\gamma$-mercaptopropyltrimethoxysilane, $\gamma$-chloropropyltrimethoxysilane, $\gamma$-chloropropylmethyldichlorosilane, or $\gamma$-chloropropylmethyldimethoxysilane may be used.

2) Ultraviolet cut-off pigment

The pigment prevents the weather strip itself and the flock portion from deterioration by ultraviolet light. Suitable ultraviolet cut-off pigments include carbon black such as channel black, acetylene black oil, furnace black, gas furnace black, or thermal black. The channel black is preferable. Graphite and iron oxide powder may also be used.

For coating the flock portion with reactive silicone, spray coating, roll coating, dip coating, or brush coating may be used. The reactive silicone is hardened by curing. The curing condition of the reactive silicone is usually at 80° to 150° C. for 1 to 20 min.

The thickness of the hardened reactive silicone layer is generally 3 to 20 $\mu$m, and 5° to 15 $\mu$m is preferable. If this thickness is less than 5 $\mu$m, the durability is not so good.

IV. Fine Powder

As the material of fine powder, a synthetic resin such as Polycarbonate resin, Nylon, or Silicone resin, and an inorganic material such as Silica, Zirconia, or Alumina, may be used. Polycarbonate, Nylon, and Silicone resin have good adhesion to the reactive silicone. Regarding the form of fine powder, a sphere is preferable, but a polyhedron, a flat piece, or irregular form may be used. The size of fine powder, for example, in case of sphere is preferably about 1 to 5 $\mu$m in diameter. The state of the fine powder may be individually dispersed or flocculated.

According to the weather strip of the present invention, the hardened layer of reactive silicone covering the flock portion shows a high water-repellency, and reduces permeation by water in the flock portion. Therefore, the quantity of frozen water is reduced. The hardened layer of reactive silicone is also not transferred to the glass, or transferred to the clothes. The fine powder which is included in the hardened layer also has the effect of lowering the dynamic friction factor thereby allowing a door window, e.g., to move more smoothly.

DETAILED DESCRIPTION OF THE PREFERRED EMBODIMENT

Figure 1:
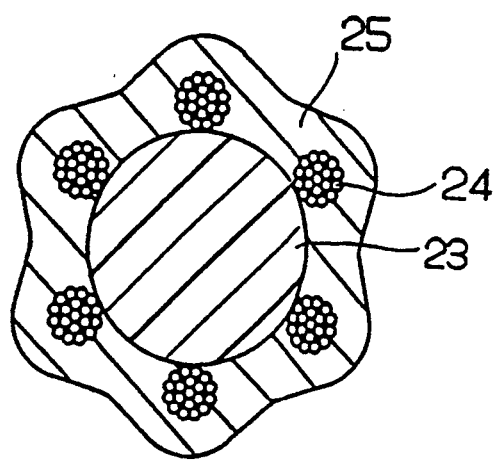
FIG. 1 is a cross-sectional view of the flock portion having the hardened layer of the present invention.

FIG. 1 shows a cross-sectional view of a pile yarn used in forming the flocking. The flocking yarn includes a center portion 23 that is provided with a hardened resin outer layer 75. The outer layer 75 includes a fine powder 24 that can be dispersed or flocculated therein.

Figure 2:
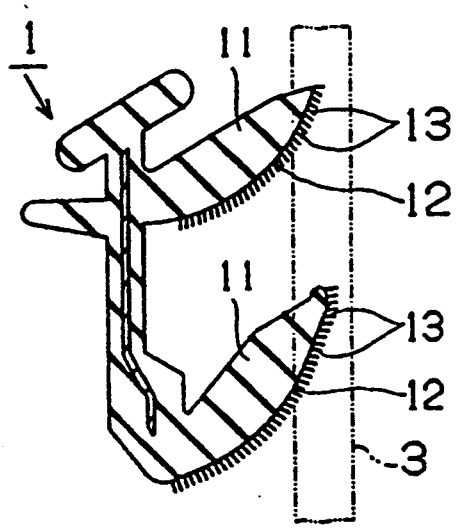
FIG. 2 is a cross-sectional view of a first embodiment of the invention.
Figure 3:
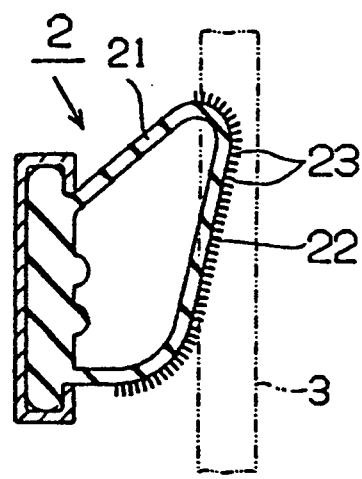
FIG. 3 is a cross-sectional view of a second embodiment of the invention.

Table 1 shows the rubber composition for weather strip 1 (the first embodiment) shown in FIG. 2 and for weather strip 2 (the second embodiment) shown in FIG. 3. The first embodiment, weather strip 1, has two sealing lips 11 and the second embodiment of the weather strip 2 has a hollow sealing portion 21.

TABLE 1

| Material | Gram |
| --- | --- |
| EPDM (JSR EP 57C) | 100 |
| MAF carbon black | 130 |
| Paraffinic process oil | 100 |
| Stearic acid | 1 |
| Zinc oxide | 5 |
| Dehydrating agent (CaO) | 5 |
| Vulcanization accelerator | 3.5 |
| Sulfur | 2 |

In Table 1, MAF carbon black is a medium abrasion surface carbon black. JSR EP 57C is a trade name of regular EPDM made by the Japan Synthetic Rubber Co., Ltd.

As shown in FIG. 2, each of the sealing lips 11 of the weather strip 1 has a flock portion 13 on the surface 12 of the sealing portions. The flock portion 13 is made of 6-Nylon piles of 3 denier (about 20 μm in diameter) and of a length of 0.8 mm. The surface 12 and the flock portion 13 are spray-coated with the reactive silicone as shown in Table 2 (shown as Test Example) excluding the fine powder. The reactive silicone was cured at 90° C. for 10 min. The thickness of the reactive silicone is about 5 μm.

As shown in FIG. 3, the surface 22 of the sealing hollow portion 21 and the flock portion 23 having the same piles mentioned above are spray-coated with the reactive silicone as shown in Table 2 (shown as Test Example) including the fine powder particles 24 mixed in. The reactive silicone was cured at 90° C. for 10 min. The thickness of the reactive silicone is about 5 μm.

TABLE 2

| Material | Preferable Embodiment | More Preferable Embodiment | Test Example |
| --- | --- | --- | --- |
| Base Material: dimethylpolysiloxane both terminal hydroxyl groups of which are blocked (M - 10000) methyhydrodienepolysiloxane (M = 10000) = 3/1 | 100 | 100 | 100 |
| Catalyst: dibutyltin laurate | 6"30 | 14"25 | 20 |
| Coupling agent: γ-aminopropyltriethyoxy-silane | 1"50 | 15"35 | 25 |
| Ultraviolet-cut-off pigment: channel black | 2"18 | 6"14 | 10 |
| Fine powder: polycarbonate resin (3 μm) | 2"18 | 6"14 | 10 |
| Solvent: isopropanol/ toluene = 1/15 | Changeable on coating operation | | 800 |

The first embodiment weather strip 1 and the second embodiment weather strip 2 were fixed to door channels of an automobile. After spraying water between these weather strips 1, 2 and the door window 3, the water was frozen, but the door window 3 was easily moved. The following tests were carried to confirm the performance.

1) Freezing test

Figure 4:
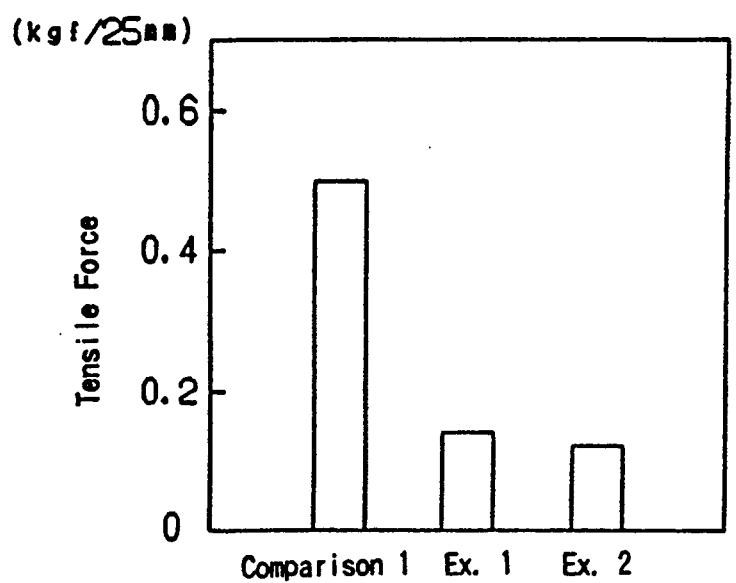
FIG. 4 shows the results of a freezing test involving the invention and a comparative weather strip.

Two weather strip test pieces of 25 mm×10 mm having the flock portion and the hardened layer were prepared. One corresponds to the first embodiment (Ex. 1) and the other corresponds to the second embodiment (Ex. 2). Then these test pieces were soaked in water for 30 min. After water was showered on the glass plates and each test piece was taken out from the water, the water on the test pieces was frozen at the temperature of −15° C. for 60 min. In the atmosphere at −15° C. test pieces were pulled access the glass plates and tensile force was measured. In comparison 1, a test piece which has a flock portion without a hardened layer was also prepared, and its tensile force was measured in the same manner. The test results are shown in FIG. 4.

2) Friction test

Figure 5:
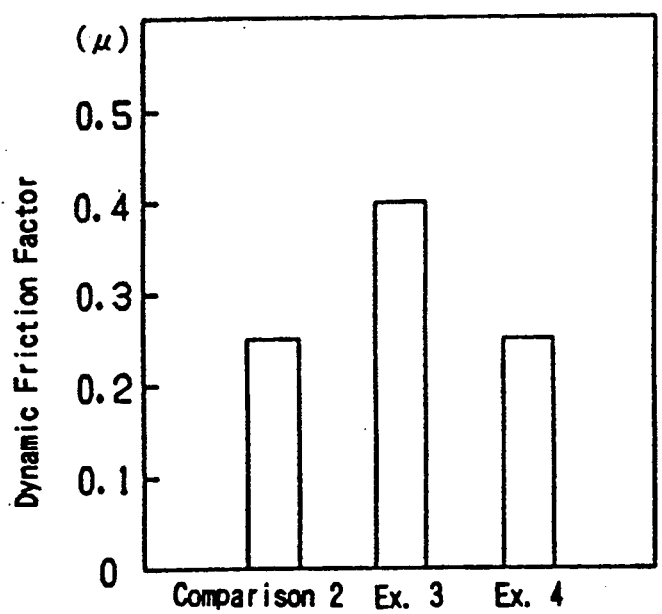
FIG. 5 shows the results of a friction test involving the invention and a comparative weather strip.
Figure 6:
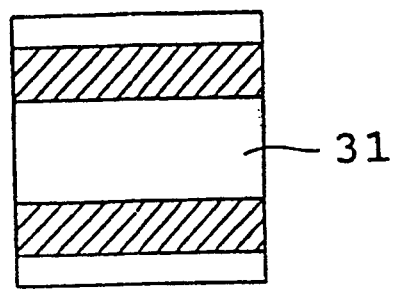
FIG. 6 is a plane view of a piece of the invention tested.
Figure 7:
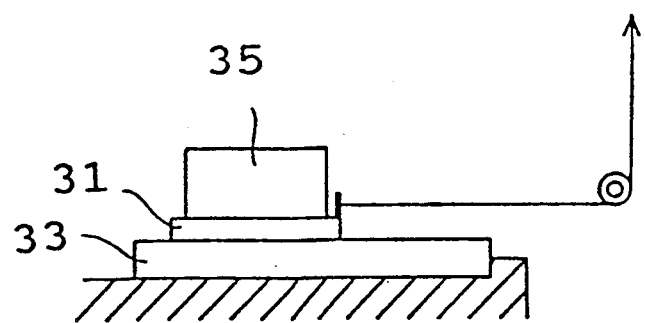
FIG. 7 is a schematic drawing of the device used for the friction test.

Two weather strip test pieces of 50 mm×50 mm×2 mm as shown in FIG. 6 were prepared and the piles were flocked on two areas of 10 mm×50 mm and the hardened layer was covered. One test piece corresponds to the first embodiment of the weather strip (Ex. 3) and the other test piece corresponds to the second embodiment (Ex. 4). The test pieces 31 were laid on a flat glass plate 33 as shown in FIG. 7 so that the surface of the flock portion contacted the glass plate. A 1 kg weight 35 was put on the middle of test pieces 31 and test pieces 31 were pulled horizontally at the pulling speed of 100 mm/min. The maximum pulling force was measured for the distance where the test pieces 31 were moved from a point at 30 mm to a point at 120 mm. An example having a flock portion without a hardened layer was tested in the same manner (comparison 2). The test results are shown in FIG. 5.

What is claimed is:

1. A weather strip comprising:
a weather strip body having a sealing portion surface;
a flock portion comprised of a plurality of individual piles adhered to said sealing portion surface; and a hardened reactive silicone coating covering substantially all of the individual piles forming said flock portion, said hardened reactive silicone layer including dispersed pockets of fine powder.

2. A weather strip according to claim 1, wherein said fine powder has an adhesion ability to said reactive silicone.

3. A weather strip according to claim 1, wherein said fine powder is a synthetic resin.

4. A weather strip according to claim 1, wherein said fine powder is an inorganic material.

5. A weather strip according to claim 1, wherein the thickness of said hardened reactive silicone layer is 5–15 μm.

6. A weather strip according to claim 1, wherein said reactive silicone comprises a base material, a catalyst and a solvent.

7. A weather strip according to claim 6, wherein said base material comprises a mixture of diorganopolysiloxane with a terminal hydroxyl group and organohydrodienesiloxane wherein the organic groups are selected from the group consisting of alkyl, alkenyl, aryl, and aralkyl groups.

8. A weather strip according to claim 6, wherein said reactive silicone further comprises a coupling agent and an ultraviolet cut-off pigment.

9. A weather strip according to claim 1, wherein said flock portion is 1–10 denier in diameter and 0.4–1.5 mm in length.

10. A weather strip according to claim 1, wherein said flock portion is 2–5 denier in diameter and 0.6–1.2 mm in length.

* * * * *